United States Patent
Ferber

(10) Patent No.: US 8,724,427 B2
(45) Date of Patent: *May 13, 2014

(54) METHOD FOR CORRECTING INPUT SEISMIC TRACES FROM DISSIPATIVE EFFECTS

(75) Inventor: Ralf Ferber, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 1270 days.

This patent is subject to a terminal disclaimer.

(21) Appl. No.: 11/573,962

(22) PCT Filed: Aug. 27, 2004

(86) PCT No.: PCT/US2004/027979
§ 371 (c)(1),
(2), (4) Date: Dec. 6, 2008

(87) PCT Pub. No.: WO2006/025823
PCT Pub. Date: Mar. 9, 2006

(65) Prior Publication Data
US 2009/0080288 A1    Mar. 26, 2009

(51) Int. Cl.
*G01V 1/28* (2006.01)

(52) U.S. Cl.
USPC .............. 367/38; 367/47; 367/28; 367/21

(58) Field of Classification Search
USPC .................... 367/38, 43; 702/17
See application file for complete search history.

(56) References Cited

U.S. PATENT DOCUMENTS

| 4,449,208 A | 5/1984 | Moeckel et al. |
| 4,706,226 A | 11/1987 | Houghtaling |
| 4,884,247 A | 11/1989 | Hadidi et al. |
| 5,555,218 A | 9/1996 | Chambers et al. |
| 6,931,324 B2 | 8/2005 | Taner et al. |
| 2004/0122596 A1* | 6/2004 | Sudhakar et al. ............... 702/17 |

FOREIGN PATENT DOCUMENTS

| EP | 0809122 A1 | 11/1997 |
| WO | 02065372 A1 | 8/2002 |

OTHER PUBLICATIONS

Zhang Changjun et al., "Estimation of quality factors from CMP records," Geophysics Soc. Exploration Geophysicists USA, Sep. 2002, pp. 1542-1547, vol. 67, No. 5, USA.

International Search Report of PCT Application No. PCT/US2004/028104 dated May 6, 2005.

Dasgupta et al., "Estimation of Q from surface seismic reflection data," Geophysics, 1998, vol. 63(6): pp. 2120-2128.

Badri et al., "Q measurements from compressional seismic waves in unconsolidated sediments," Geophysics, 1987, vol. 52(6): pp. 772-784.

* cited by examiner

*Primary Examiner* — Isam Alsomiri
*Assistant Examiner* — Daniel L Murphy

(57) ABSTRACT

A method and apparatus for correcting an input seismic trace. The method includes receiving the input seismic trace and creating a t by Q gather using the input seismic trace, where t represents traveltime, Q represents absorption parameter, and the t by Q gather has traveltime as the vertical axis and a ratio of t and Q as the horizontal axis. The ratio of t and Q is referred to as R. The method further includes applying an interpolation algorithm to the t by Q gather to derive a corrected input seismic trace.

27 Claims, 7 Drawing Sheets

METHOD FOR CORRECTING INPUT SEISMIC TRACES FROM DISSIPATIVE EFFECTS

BACKGROUND OF THE INVENTION

1. Field of the Invention

One or more embodiments of the present invention generally relate to seismic data processing, and more particularly to correcting seismic data from dissipative effects.

2. Description of the Related Art

In seismic exploration, seismic data are obtained by first creating an artificial disturbance along the earth by use of dynamite or the like. The resulting acoustic waves travel downwardly in the earth and are reflected upward from subsurface reflecting interfaces. The reflected waves are received at detectors or geophones located along the ground and recorded in reproducible form. Ideally, the signals recorded at the detectors would be exactly representative of the reflection characteristics of the earth without the presence of any undesirable components, such as noise or distortion.

Unfortunately, the signals recorded at the detectors often contain many undesirable components which obscure the reflectivity function of the earth and prevent the finding of an area of the earth where oil and gas deposits may be present. Several phenomena exist in causing distortion to the recorded signals. One such phenomenon is absorption, which causes the actual loss of seismic energy by converting it to other forms of energy. This type of loss of seismic energy is generally known as intrinsic attenuation. A second phenomenon is intrabed multiple interference. Intrabed multiple interference redistributes seismic energy between downward and upward directions. This type of loss of seismic energy is generally known as apparent attenuation. Apparent attenuation causes a progressive loss of the higher frequencies (broadening of the seismic wavelet) and an increasing phase distortion with increasing traveltime for the seismic wavelet received.

The combination of intrinsic and apparent attenuation is generally known as the earth filter. As a result of earth filtering, the seismic wavelet is time varying. The existence of a time varying seismic wavelet violates a basic assumption of deconvolution theory and impairs the ability to use deconvolution to determine the earth filter characteristics as part of a method of seismic interpretation.

One conventional approach to compensate for earth filter attenuation is disclosed in *Q-Adaptive Deconvolution*, by D. Hale, Stanford Exploration Project, Report 30, 1982. Hale discloses two iterative procedures for implementing inverse Q-filtering. However, the procedures disclosed by Hale make several assumptions which cause Hale to arrive at an approximate dispersion relationship. Use of the approximate dispersion relationship, in turn, degrades the value of the Q compensation obtained by Hale.

Therefore, a need exists in the art for an improved method for correcting input seismic traces from dissipative effects through the use of Q-filtering.

SUMMARY OF THE INVENTION

One or more embodiments of the present invention are directed to a filter bank solution to Q-filtering for modeling, compensation and estimation of absorption in seismic data. Q-filtering generally refers to the application of time variant filters with amplitude and phase transfer functions that conventionally depend on traveltime and absorption parameter $Q(t)$ as a function of that traveltime. Applicant has observed that traveltime $t$ and absorption parameter $Q(t)$ are coupled parameters, and as a result, Q-filtering may be re-parameterized as a ratio (R) of traveltime $t$ and absorption parameter $Q(t)$, which may be expressed as $R=t/Q(t)$. In this manner, various embodiments of the invention propose a one-dimensional parametric family of filters, which modifies Q-filtering from a time variant filtering operation to the application of a range of time-invariant filters.

In one embodiment, the present invention is directed to a method for correcting an input seismic trace. The method includes receiving the input seismic trace and creating a t by Q gather using the input seismic trace, where t represents traveltime, Q represents absorption parameter, and the t by Q gather has traveltime as the vertical axis and a ratio of t and Q as the horizontal axis. The ratio of t and Q is referred to as R. The method further includes applying an interpolation algorithm to the t by Q gather to derive a corrected input seismic trace.

In another embodiment, the method for correcting an input seismic trace includes receiving the input seismic trace, filtering the input seismic trace using an amplitude correction filter expressed as $A_R(f)=\exp(\text{sgn}\pi f R)$ and a phase correction filter expressed as $$\varphi_R(f) = \text{sgn}2f\ln\left(\frac{f_{max}}{f}\right)R$$

to generate a plurality of filtered input seismic traces in the time domain, where f represents the frequency of the input seismic trace, $f_{max}$ represents the maximum frequency of the input seismic trace, and R represents a ratio between traveltime and absorption parameter. The method further includes applying an interpolation algorithm to filtered input seismic traces in the time domain to derive a corrected input seismic trace.

In yet another embodiment, embodiments of the invention are directed to a method for processing an input seismic trace. The method includes receiving the input seismic trace and creating a t by Q gather using the input seismic trace, where t represents traveltime, Q represents absorption parameter, and the t by Q gather has traveltime as the vertical axis and a ratio of t and Q as the horizontal axis. The ratio of t and Q is referred to as R.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
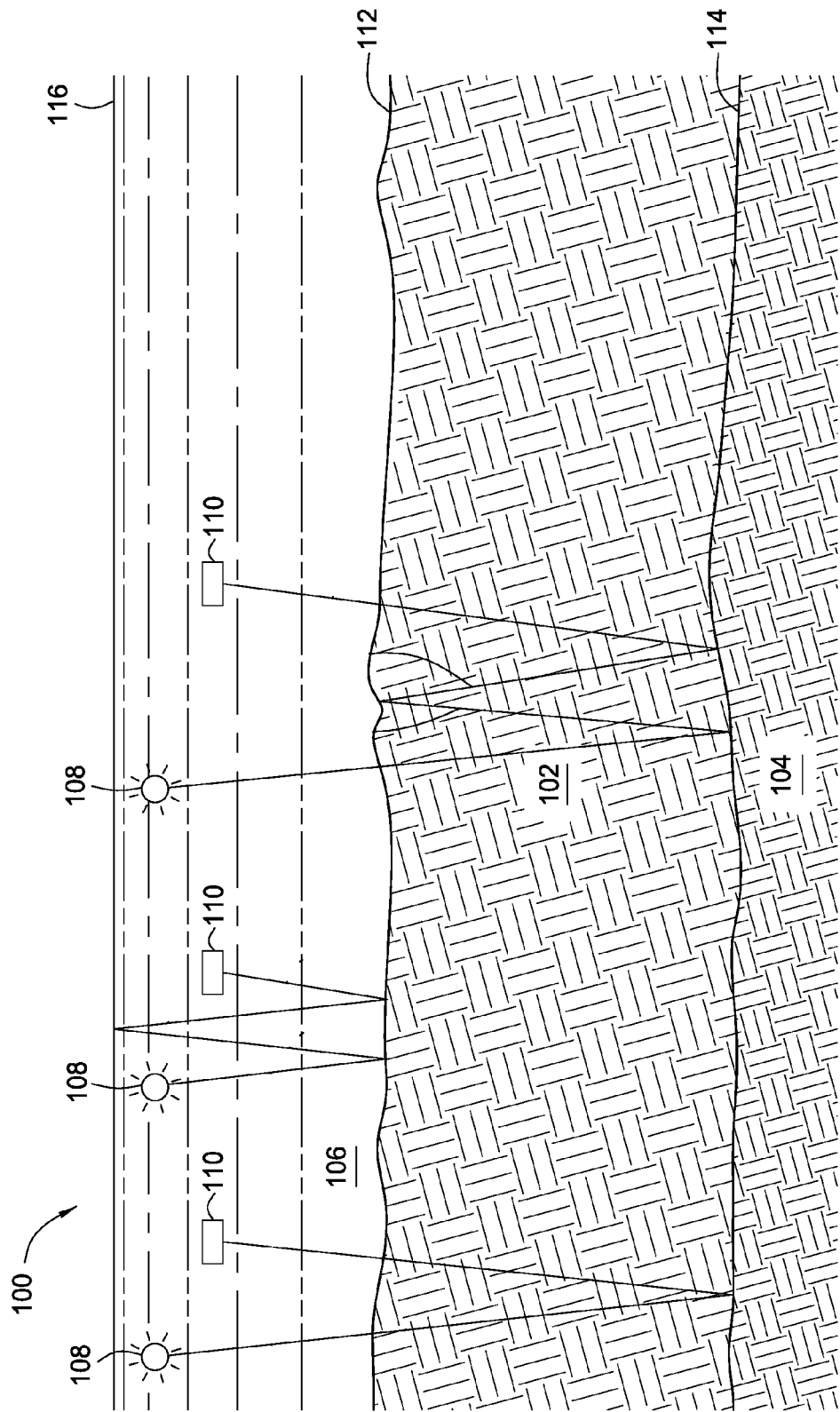
FIG. 1 illustrates a schematic view of marine seismic surveying for which various embodiments of the invention may be used.

One or more embodiments of the invention may be used in connection with various seismic surveying, such as marine seismic surveying, land seismic surveying, seabed seismic surveying, bore hole seismic surveying and the like. FIG. 1 illustrates a schematic view of marine seismic surveying 100 for which various embodiments of the invention may be used. Subterranean formations to be explored, such as 102 and 104, lie below a body of water 106. Seismic energy sources 108 and seismic receivers 110 are positioned in the body of water 106, typically by one or more seismic vessels (not shown). A seismic source 108, such as an air gun, creates seismic waves in the body of water 106 and a portion of the seismic waves travels downward through the water toward the subterranean formations 102 and 104 beneath the body of water 106. When the seismic waves reach a seismic reflector, a portion of the seismic waves reflects upward and a portion of the seismic waves continues downward. The seismic reflector can be the water bottom 112 or one of the interfaces between subterranean formation, such as interface 114 between formations 102 and 104. When the reflected waves traveling upward reach the water/air interface at the water surface 116, a majority portion of the waves reflects downward again. Continuing in this fashion, seismic waves can reflect multiple times between upward reflectors, such as the water bottom 112 or formation interface 114, and the downward reflector at the water surface 116 above. Each time the reflected waves propagate past the position of a seismic receiver 110, the receiver 110 senses the reflected waves and generates representative seismic signals. These seismic signals may then be used to yield valuable information regarding the geophysical characteristics of the explored subterranean formations.

Figure 2:
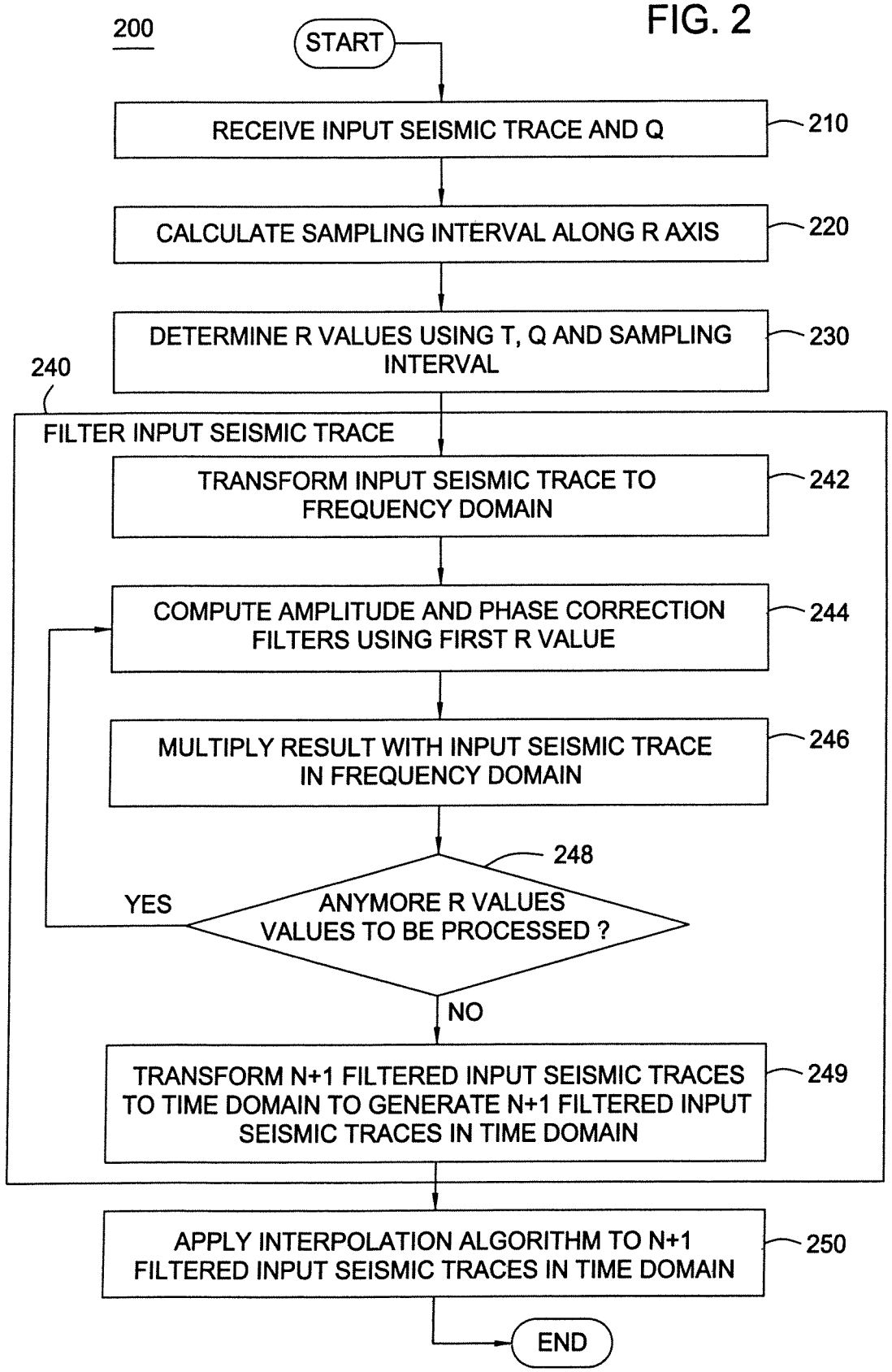
FIG. 2 illustrates a method for correcting an input seismic trace from dissipative effects in accordance with one embodiment of the invention.

FIG. 2 illustrates a method 200 for correcting an input seismic trace from dissipative effects in accordance with one embodiment of the invention. Steps 210 through 249 are directed toward creating a t by Q gather, which is defined by an R axis and a t axis, where R=t/Q, and t represents traveltime. Q represents absorption parameter and may often be referred to as the seismic quality factor. Q may also be a function of traveltime t and as such be referred to as Q(t). At step 210, an input seismic trace and an absorption parameter Q(t) are received. The absorption parameter Q(t) may be retrieved from a table stored in a data base. In one embodiment, the absorption parameter Q(t) may be a range of absorption parameter Q(t) values, which includes minimum and maximum Q(t) values. In yet another embodiment, the absorption parameter Q(t) value may be determined using method 500 or method 600, as described below with reference to FIGS. 5 and 6.

At step 220, a sampling interval along the R axis, ΔR, is calculated according to $$\Delta R = \frac{\pi e}{2 f_{max}}, \quad \text{(Equation 1)}$$

where $f_{max}$ represents an estimate of the maximum frequency in the input seismic trace. For example, the sampling interval along the R axis is about 0.043 seconds for a maximum frequency of about 100 Hz. In one embodiment, the largest sampling interval for which the t by Q gather is not aliased is selected.

Equation 1 may be derived by analyzing a phase correction filter $$\varphi_R(f) = \text{sgn} 2 f \ln\left(\frac{f_c}{f}\right) R, \quad \text{(Equation 2)}$$

where R=t/Q, f represents the frequency of the input seismic trace in the frequency domain, $f_c$ represents the cutoff frequency of the input seismic trace, sgn=−1 when the filters are used for modeling absorption and sgn=1 when the filters are used for compensation (i.e., inverse Q-filtering). The maximum frequency $f_{max}$ of the input seismic trace may be introduced into Equation 2 to distinguish the effect of the cutoff frequency $f_c$ as a simple time variant time shift, which may be expressed as:

$$\varphi_R(f) = \text{sgn} 2 f \ln\left(\frac{f_c}{f} \frac{f_{max}}{f_{max}}\right)$$

$$R = \text{sgn} 2 f \ln\left(\frac{f_{max}}{f}\right) R + \text{sgn} 2 f \ln\left(\frac{f_c}{f_{max}}\right) R. \quad \text{(Equation 3)}$$

The R value in the first portion of Equation 3 for which the phase reaches the value of 2π the first time is determined. It is observed that this R value is the wavelength along the R axis of the periodic complex valued function $e^{j\Phi_R(f)}$ and may be expressed as:

$$\lambda(f) = \frac{\pi}{f \ln\left(\frac{f_{max}}{f}\right)} \quad \text{(Equation 4)}$$

The corresponding frequency along the R axis $f_R(f)$ may be expressed as:

$$f_R(f) = \frac{1}{\pi} f \ln\left(\frac{f_c}{f}\right) \quad \text{(Equation 5)}$$

Equation 5 is then solved for the maximum value of the frequency along the R axis as a function of the temporal frequencies between zero and $f_{max}$. The maximum value of the R frequencies may be used to define the sampling interval ΔR, which may be represented as:

$$\Delta R = \frac{1}{2 \max_f \left(\frac{1}{\pi} f \ln\left(\frac{f_{max}}{f}\right)\right)} \quad \text{(Equation 6)}$$

The temporal frequency at which Equation 5 reaches its maximum value may be estimated as:

$$\hat{f} = e^{(\ln(f_{max})-1)} = \frac{f_{max}}{e} \quad \text{(Equation 7)}$$

Accordingly, substituting Equation 7 into Equation 6 leads to $$\Delta R = \frac{\pi e}{2 f_{max}}.$$

At step 230, a plurality of R values are determined using t, Q(t) and the sampling interval ΔR. In one embodiment, n+1 R values are determined, where $$R_{min} = \min\left(\frac{t}{Q(t)}\right),$$

$$R_{max} = \max\left(\frac{t}{Q(t)}\right), \text{ and}$$

$$R_n = R_{min} + (n)\Delta R$$

where n=0, 1, 2, 3 . . . until $R_n$=$R_{max}$. At n=0, $R_0$=$R_{min}$.

At step 240, the input seismic trace is filtered using an amplitude correction filter $A_R(f)$=exp(sgnπfR), the phase correction filter $$\varphi_R(f) = \text{sgn} 2f \ln\left(\frac{f_{max}}{f}\right) R,$$

and the R values generated at step 230, where f represents the frequency of the input seismic trace, $f_{max}$ represents the maximum frequency of the input seismic trace, sgn=−1 when the filters are used for modeling absorption and sgn=1 when the filters are used for compensation (i.e., inverse Q filtering). In one embodiment, the input seismic trace may be filtered using the above mentioned amplitude and phase correction filters by first transforming the input seismic trace to the frequency domain (step 242). In one embodiment, the input seismic trace is transformed using a fast Fourier transform. Then, at step 244, the amplitude and phase correction filters are computed using the first R value. At step 246, the result of step 244 is multiplied with the input seismic trace in the frequency domain. In one embodiment, the result is multiplied with the complex numbers of the input seismic trace in the frequency domain. The result of step 244 may be capped by a maximum value. At step 248, a determination is made as to whether another R value from the n+1 R values generated at step 230 needs to be processed. If the answer is in the affirmative, processing returns to step 244. In this manner, processing continues until all of the n+1 R values have been processed through steps 244-248, thereby generating an n+1 filtered input seismic traces in the frequency domain. In this manner, the input seismic trace may be filtered in the frequency domain. At step 249, the n+1 filtered input seismic traces are transformed to the time domain, thereby generating an n+1 filtered input seismic traces in the time domain, which make up the t by Q gather. In one embodiment, the transformation to the time domain is performed using an inverse fast Fourier transform.

At step 250, an interpolation algorithm is applied to the t by Q gather along an R(t) curve to derive a corrected input seismic trace, where R(t)=t/Q(t). The interpolation algorithm used in step 250 may be a linear interpolation or any other interpolation algorithm commonly known by those skilled in the art. The application of the interpolation algorithm may also be known as "slicing through" the t by Q gather along the R(t) curve. Steps 210 through 250 may be repeated for other input seismic traces. In this manner, the corrected input seismic trace may be derived by taking for each time sample of the filtered input seismic trace, the corresponding time sample from the filtered input seismic traces closest to the R(t) curve.

Figure 4A:
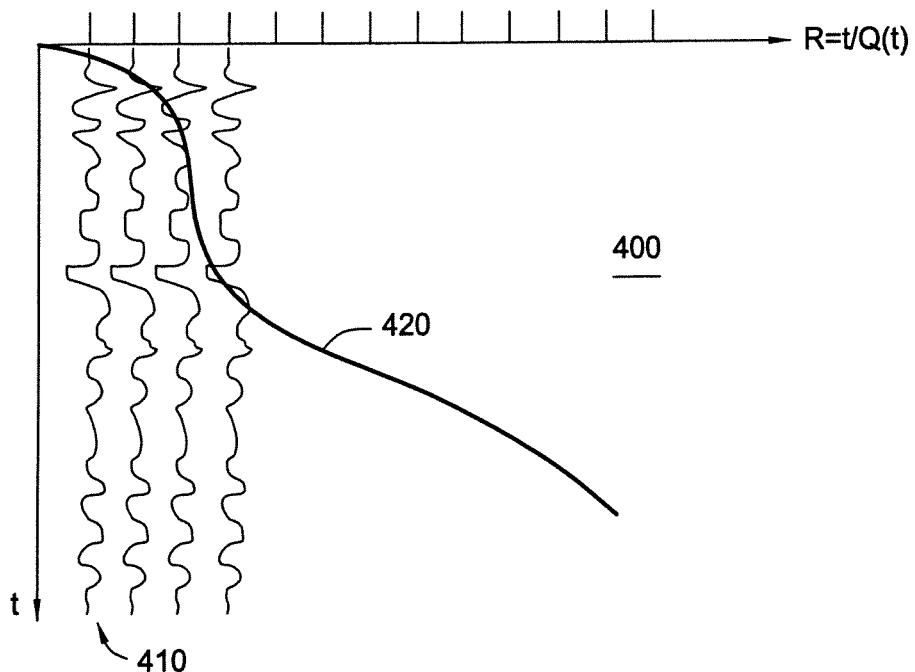
FIG. 4A illustrates t by Q gather in accordance with one embodiment of the invention.

FIG. 4A illustrates a t by Q gather 400 in accordance with one embodiment of the invention. The t by Q gather 400 is comprised within a horizontal axis of R and a vertical axis of traveltime t. The t by Q gather is made up of n+1 filtered input seismic traces 410. The first filtered input seismic trace 410 is generated using the $R_{min}$ and the last filtered input seismic trace 410 is generated using $R_{max}$. The t by Q gather also includes an R(t) curve 420 intersecting the n+1 filtered input seismic traces 410. The t by Q gather may be sliced through along the R(t) curve 420 to generate the corrected input seismic trace.

Figure 4B:
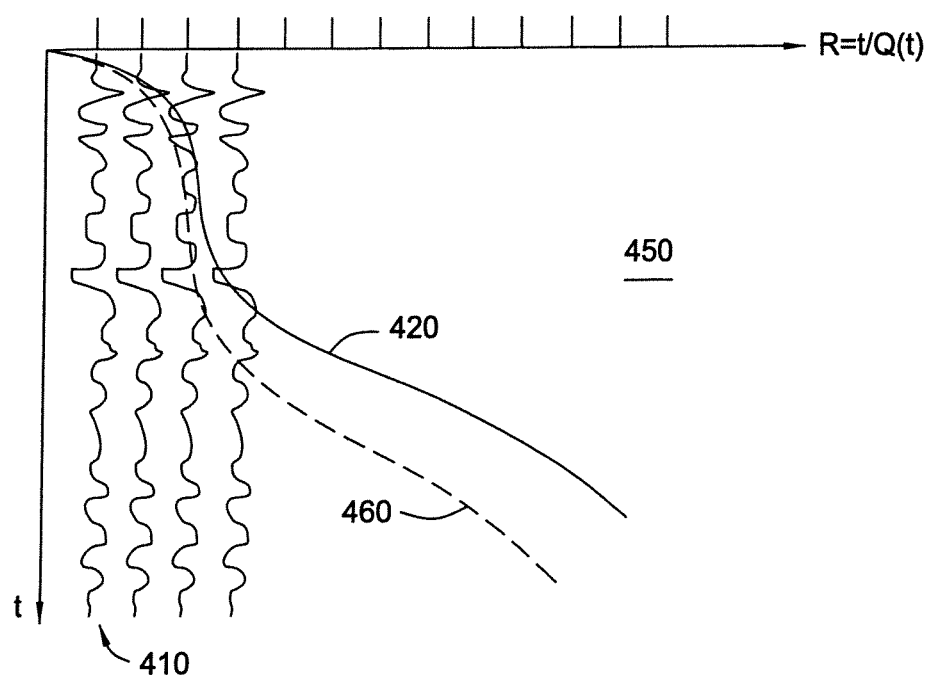
FIG. 4B illustrates t by Q gather in accordance with another embodiment of the invention.

In an embodiment in which the cutoff frequency $f_c$ is not the same as the maximum frequency $f_{max}$, the t by Q gather may be "sliced through" an R'(t) curve, which may be expressed as R'(t)=R(t)+sgnτ(R(t)), where sgnτ(R(t)) is derived from $$\tau(R) = \text{sgn}\frac{1}{\pi}\ln\left(\frac{f_c}{f_{max}}\right) R,$$

which is the equivalent to the time shift portion of Equation 3. An example of an R'(t) curve 460 with respect to an R(t) curve 420 is illustrated in FIG. 4B. As illustrated, R'(t) curve 460 differs from R(t) curve 420 by a time shift of sgnτ(R(t)).

Figure 3:
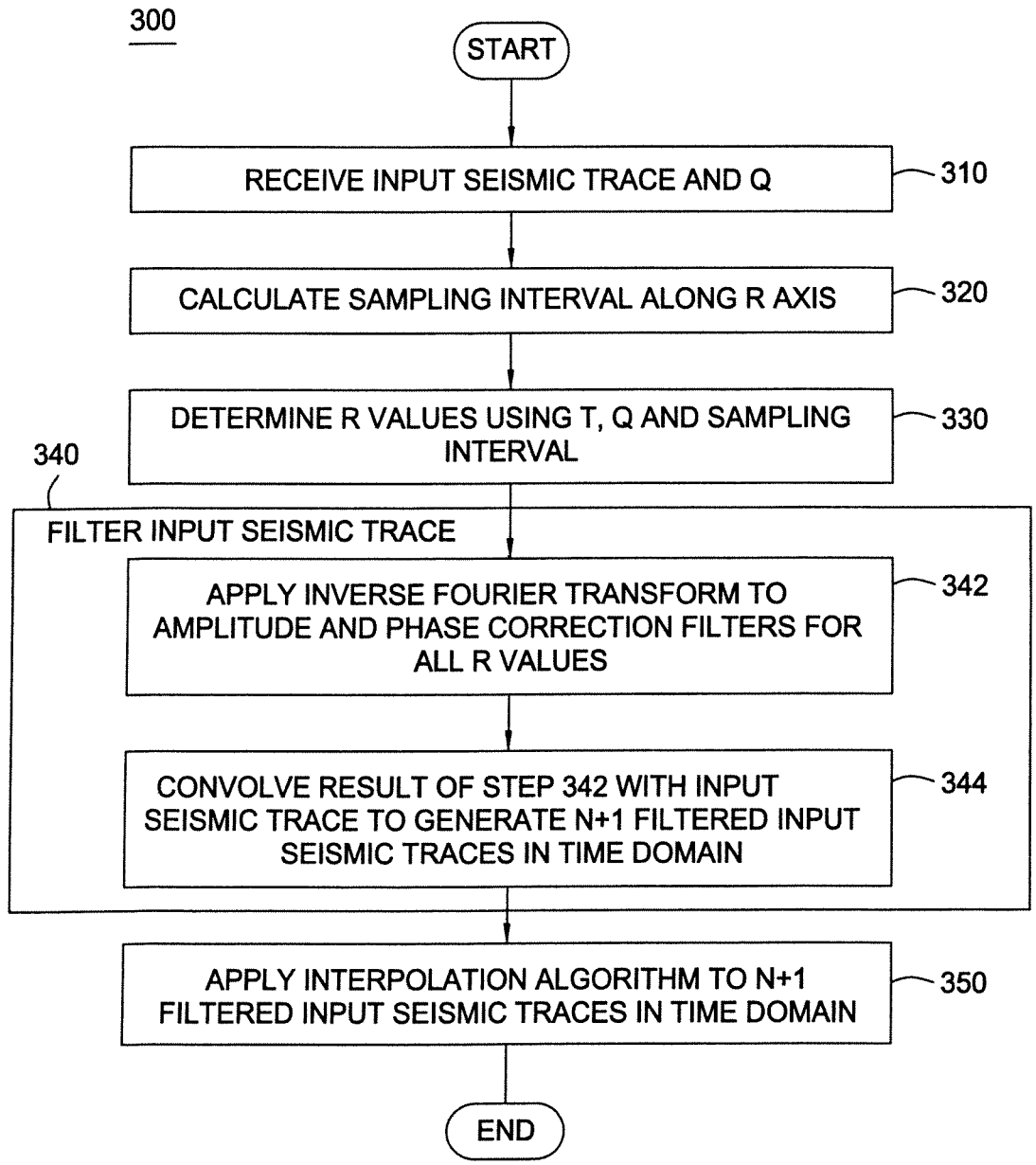
FIG. 3 illustrates a method for correcting an input seismic trace from dissipative effects in accordance with another embodiment of the invention.

FIG. 3 illustrates a method 300 for correcting an input seismic trace from dissipative effects in accordance with another embodiment of the invention. Steps 310 through 330 perform the same steps as steps 210 through 230. Accordingly, details of steps 310 through 330 may be found with reference to steps 210 through 230. At step 340, the input seismic trace is filtered using an amplitude correction filter $A_R(f)$=exp(sgnπfR), a phase correction filter $$\varphi_R(f) = \text{sgn} 2f \ln\left(\frac{f \max}{f}\right) R,$$

and the R values generated at step 330. In one embodiment, the input seismic trace may be filtered by first applying an inverse Fourier transform to the amplitude and phase correction filters for all R values (step 342). In this manner, the amplitude and phase correction filters are transformed to the time domain. At step 344, the result of step 342 is convolved with the input seismic trace to generate the n+1 filtered input seismic traces in the time domain, which make up the t by Q gather. The input seismic trace may also be filtered with other types of convolution filters commonly known by persons with ordinary skill in the art. At step 350, an interpolation algorithm is applied to the t by Q gather along the R(t) curve to derive a corrected input seismic trace. Step 350 performs the same step as step 250. Accordingly, details of step 350 may be found with reference step 250.

Figure 5:
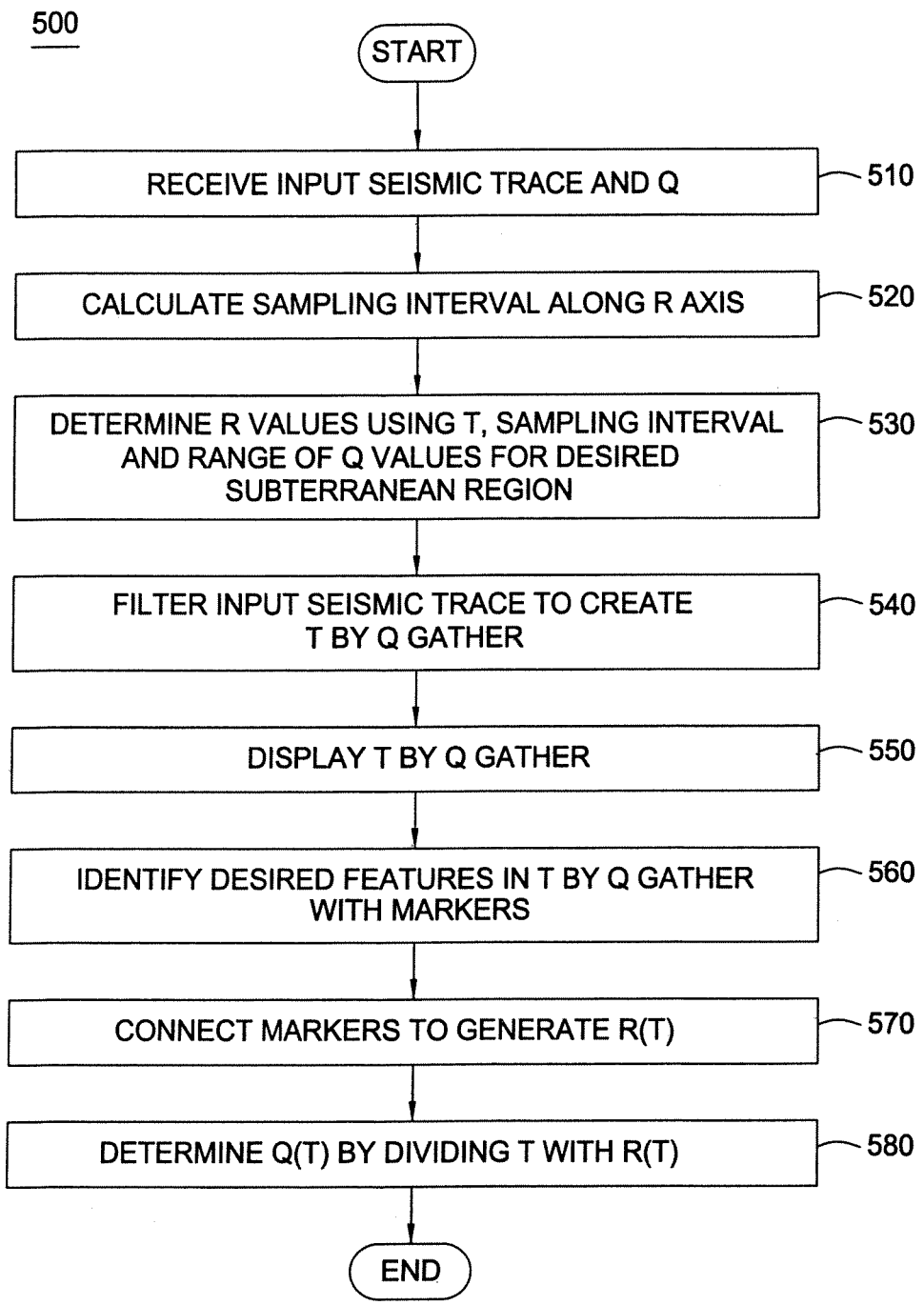
FIG. 5 illustrates a flow diagram of a method for generating an estimated value of Q(t) in accordance with one embodiment of the invention.

FIG. 5 illustrates a flow diagram of a method 500 for generating an estimated value of Q(t) in accordance with one embodiment of the invention. Steps 510 through 540 are directed toward creating a t by Q gather. At step 510, an input seismic trace is received. At step 520, a sampling interval along the R axis, ΔR, is calculated according to $$\Delta R = \frac{\pi e}{2 f_{max}}.$$

At step 530, a plurality of R values are determined using t, the sampling interval ΔR, and a range of Q(t) values, e.g., minimum and maximum Q(t) values, for a desired subterranean region. Steps 510 through 530 are the same as steps 210 through 230 except that the typical range of Q(t) values for the desired subterranean region is used to calculate the R values, as opposed to a single Q(t) value. Accordingly, details of steps 510 through 530 may be found with reference steps 210 through 230.

At step 540, the input seismic trace is filtered using an amplitude correction filter $A_R(f)=\exp(\text{sgn}\pi fR)$, a phase correction filter $$\varphi_R(f) = \text{sgn} 2f \ln\left(\frac{f_{max}}{f}\right) R,$$

and the R values generated at step 530. The input seismic trace may be filtered using the fast Fourier transform, as described in method 200, or the convolution algorithm, as described in method 400. At the end of step 540, an n+1 filtered input seismic traces in the time domain are generated to create the t by Q gather. Steps 510 through 540 may be repeated to generate a plurality of t by Q gathers.

At step 550, the t by Q gather is displayed on a display medium, such as a screen or a visualization center. At step 560, two or more desired features in the t by Q gather are identified. The desired features may be identified using markers or other identifiers. At step 570, the desired markers are connected to generate an R(t) curve. The desired markers may be connected by a linear line, or any other curve fitting algorithm commonly known by persons with ordinary skill in the art. At step 580, the Q(t) is determined by dividing the traveltime t by R(t).

Figure 6:
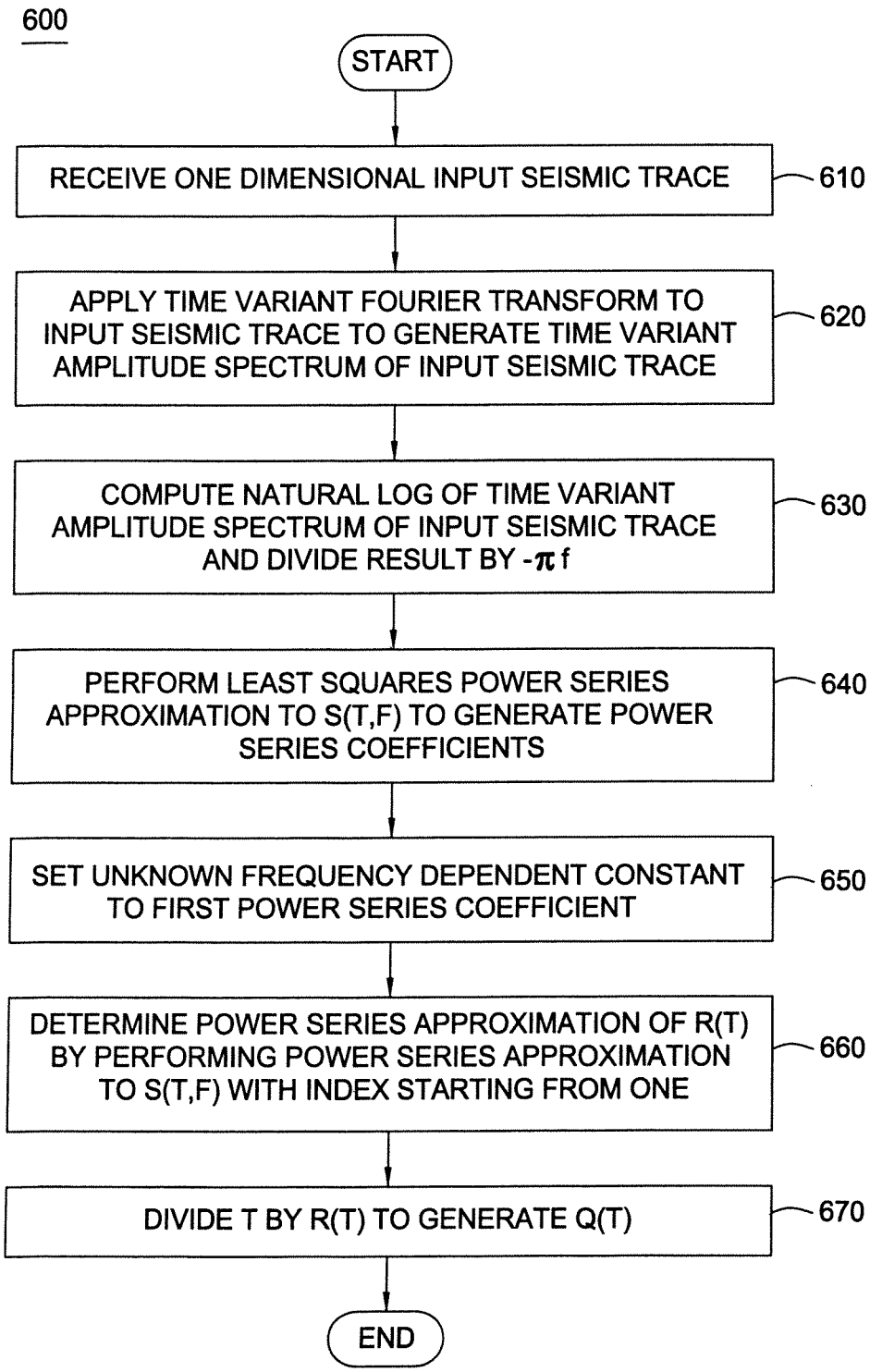
FIG. 6 illustrates a flow diagram of a method for generating an estimated value of Q(t) in accordance with another embodiment of the invention.

FIG. 6 illustrates a flow diagram of a method 600 for generating an estimated value of a time variant Q(t) in accordance with another embodiment of the invention. At step 610, a one dimensional input seismic trace, i.e., based on traveltime t, is received. At step 620, a time variant Fourier transform is applied to the input seismic trace to generate a time variant amplitude spectrum of the input seismic trace, which may be represented as X(t, f). The time variant amplitude spectrum of the input seismic trace X(t, f) may be expressed as:

$$X(t,f) = A(t,f) W(f) I(f) \quad \text{(Equation 8)},$$

where A(t, f) represents a time variant exponential absorption term, W(f) represents a time invariant source wavelet, and I(f) represents a time-invariant reflectivity. The time variant exponential absorption term A(t, f) may be expressed as:

$$A(t,f) = \exp(-\pi f R(t)) \quad \text{(Equation 9)},$$

where $$R(t) = \frac{t}{Q(t)}.$$

At step 630, the natural logarithm of the time variant amplitude spectrum of the input seismic trace X(t, f) is calculated and the result is divided by $-\pi f$. Step 630 may be expressed as:

$$S(t, f) = \frac{\ln(X(t, f))}{-\pi f} = R(t) + c(f). \quad \text{(Equation 10)}$$

At step 640, a least squares power series approximation to S(t, f) is performed to generate a plurality of power series coefficients $s_i$, i.e., $s_0, s_1, s_2, \ldots s_n$. The least squares estimate to the power series coefficients may be computed by solving the following minimization problem:

$$\left\| S(t, f) - \sum_{i=0}^{n} s_i t^i \right\|^2 \to \min.$$

In one embodiment, the least squares powers series is of a low order, i.e., n is a small number, e.g., from about 2 to about 8.

S(t, f) may also be expressed as: $S(t, f) = R(t) + c(f)$ where c(f) represents an unknown frequency dependent constant. At step 650, the unknown frequency dependent constant c(f) is set to be equal to the first power series coefficient $s_0$. At step 660, a power series approximation to R(t) is determined by performing a power series approximation to S(t, f) with the index starting from 1, as opposed to 0, i.e., without using the first power series coefficient $s_0$. The power series approximation to R(t) may be expressed as:

$$\hat{R}(t) = \sum_{i=1}^{n} s_i t^i.$$

In this manner, the ratio of traveltime t and time variant Q(t) may be approximated by the power series approximation.

At step 670, the traveltime t is divided by R(t) to generate an estimated value of the time variant Q(t).

Figure 7:
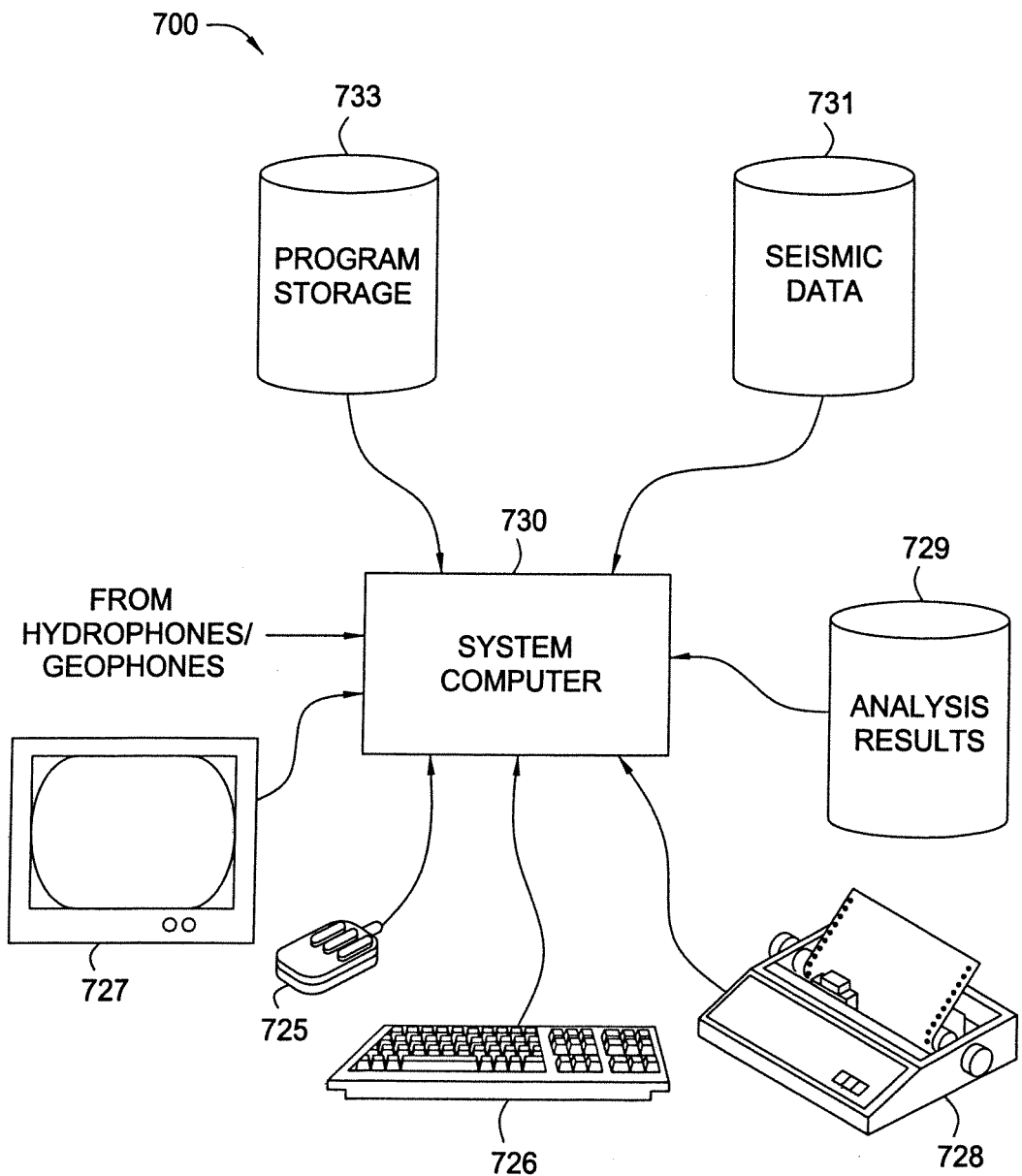
FIG. 7 illustrates a computer network, into which embodiments of the invention may be implemented.

FIG. 7 illustrates a computer network 700, into which embodiments of the invention may be implemented. The computer network 700 includes a system computer 730, which may be implemented as any conventional personal computer or workstation, such as a UNIX-based workstation. The system computer 730 is in communication with disk storage devices 729, 731, and 733, which may be external hard disk storage devices. It is contemplated that disk storage devices 729, 731, and 733 are conventional hard disk drives, and as such, will be implemented by way of a local area network or by remote access. Of course, while disk storage devices 729, 731, and 733 are illustrated as separate devices, a single disk storage device may be used to store any and all of the program instructions, measurement data, and results as desired.

In one embodiment, seismic data from hydrophones are stored in disk storage device 731. The system computer 730 may retrieve the appropriate data from the disk storage device 731 to perform the seismic traces correction method according to program instructions that correspond to the methods described herein. The program instructions may be written in a computer programming language, such as C++, Java and the like. The program instructions may be stored in a computer-readable memory, such as program disk storage device 733. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 730 presents output primarily onto graphics display 727, or alternatively via printer 728. The system computer 730 may store the results of the methods described above on disk storage 729, for later use and further analysis. The keyboard 726 and the pointing device (e.g., a mouse, trackball, or the like) 725 may be provided with the system computer 730 to enable interactive operation.

The system computer 730 may be located at a data center remote from the survey region. The system computer 730 is in communication with hydrophones (either directly or via a recording unit, not shown), to receive signals indicative of the reflected seismic energy. These signals, after conventional formatting and other initial processing, are stored by the system computer 730 as digital data in the disk storage 731 for subsequent retrieval and processing in the manner described above. While FIG. 7 illustrates the disk storage 731 as directly connected to the system computer 730, it is also contemplated that the disk storage device 731 may be accessible through a local area network or by remote access. Furthermore, while disk storage devices 729, 731 are illustrated as separate devices for storing input seismic data and analysis results, the disk storage devices 729, 731 may be implemented within a single disk drive (either together with or separately from program disk storage device 733), or in any other conventional manner as will be fully understood by one of skill in the art having reference to this specification While the foregoing is directed to embodiments of the present invention, other and further embodiments of the invention may be devised without departing from the basic scope thereof, and the scope thereof is determined by the claims that follow.

What is claimed is:

1. A method for correcting an input seismic trace, comprising:
receiving the input seismic trace;
creating, using a computer, a t by Q gather using the input seismic trace, wherein t represents traveltime, Q represents absorption parameter, and the t by Q gather has traveltime as the vertical axis and a ratio of t and Q as the horizontal axis, wherein the ratio of t and Q is referred to as R; and
applying an interpolation algorithm to the t by Q gather to derive a corrected input seismic trace.

2. The method of claim 1, wherein the interpolation algorithm is a linear interpolation algorithm.

3. The method of claim 1, wherein creating the t by Q gather comprises receiving an absorption parameter Q(t).

4. The method of claim 1, wherein creating the t by Q gather further comprises calculating a sampling interval along the horizontal axis.

5. The method of claim 4, wherein the sampling interval is calculated using an equation $$\Delta R = \frac{\pi e}{2 f_{max}},$$

wherein $\Delta R$ represents the sampling interval and $f_{max}$ represents the maximum frequency of the input seismic trace.

6. The method of claim 4, wherein the sampling interval is the largest interval for which the t by Q gather is not aliased.

7. The method of claim 4, wherein creating the t by Q gather further comprises determining a plurality of R values using t, Q(t) and the sampling interval.

8. The method of claim 7, wherein creating the t by Q gather comprises filtering the input seismic trace using an amplitude correction filter expressed as $A_R(f)=\exp(\text{sgn}\pi fR)$ and a phase correction filter expressed as $$\varphi_R(f) = \text{sgn}2f\ln\left(\frac{f_{max}}{f}\right)R,$$

wherein f represents the frequency of the input seismic trace and $f_{max}$ represents the maximum frequency of the input seismic trace.

9. The method of claim 8, wherein filtering the input seismic trace comprises:
transforming the input seismic trace to a frequency domain;
computing the amplitude and phase correction filters for each R value; and
multiplying the result with the input seismic trace in the frequency domain to generate a plurality of filtered input seismic traces in the frequency domain.

10. The method of claim 9, wherein filtering the input seismic trace further comprises transforming the filtered input seismic traces in the frequency domain to a time domain.

11. The method of claim 10, wherein the filtered input seismic traces in the time domain make up the t by Q gather.

12. The method of claim 9, wherein filtering the input seismic trace further comprises transforming the filtered input seismic traces in the frequency domain to a time domain using an inverse fast Fourier transform.

13. The method of claim 8, wherein filtering the input seismic trace comprises:
transforming the input seismic trace to a frequency domain;
computing the amplitude and phase correction filters for each R value; and
multiplying the result with the complex numbers of the input seismic trace in the frequency domain to generate a plurality of filtered input seismic traces in the frequency domain.

14. The method of claim 8, wherein filtering the input seismic trace comprises applying an inverse Fourier transform to the amplitude and phase correction filters for each R value.

15. The method of claim 1, wherein creating the t by Q gather comprises filtering the input seismic trace using an amplitude correction filter expressed as $A_R(f)=\exp(\text{sgn}\pi fR)$, wherein f represents the frequency of the input seismic trace.

16. The method of claim 1, wherein creating the t by Q gather comprises filtering the input seismic trace using a phase correction filter expressed as $$\varphi_R(f) = \text{sgn}2f\ln\left(\frac{f_{max}}{f}\right)R,$$

wherein f represents the frequency of the input seismic trace and $f_{max}$ represents the maximum frequency of the input seismic trace.

17. The method of claim 1, wherein creating the t by Q gather comprises filtering the input seismic trace using an amplitude correction filter expressed as $A_R(f)=\exp(\text{sgn}\pi fR)$ and a phase correction filter expressed as $$\varphi_R(f) = \text{sgn}2f\ln\left(\frac{f_{max}}{f}\right)R,$$

wherein f represents the frequency of the input seismic trace and $f_{max}$ represents the maximum frequency of the input seismic trace.

18. The method of claim 17, wherein filtering the input seismic trace comprises transforming the amplitude and phase correction filters to a time domain.

19. The method of claim 18, wherein filtering the input seismic trace further comprises convolving the input seismic trace with the amplitude and phase correction filters in the time domain to generate a plurality of filtered input seismic traces in the time domain.

20. The method of claim 19, wherein the filtered input seismic traces in the time domain make up the t by Q gather.

21. The method of claim 1, wherein creating the t by Q gather comprises transforming the input seismic trace to a frequency domain.

22. The method of claim 1, wherein creating the t by Q gather comprises transforming the input seismic trace to a frequency domain using a fast Fourier transform.

23. A method for processing an input seismic trace, comprising:
receiving the input seismic trace; and
creating, using a computer, a t by Q gather using the input seismic trace, wherein t represents traveltime, Q represents absorption parameter, and the t by Q gather has traveltime as the vertical axis and a ratio of t and Q as the horizontal axis, wherein the ratio of t and Q is referred to as R.

24. The method of claim 23, wherein creating the t by Q gather comprises:
transforming the input seismic trace to a frequency domain;
filtering the input seismic trace in the frequency domain through an amplitude correction filter and a phase correction filter to generate a plurality of filtered input seismic traces in the frequency domain; and
transforming the filtered input seismic traces in the frequency domain to a time domain.

25. A non-transitory computer-readable medium having stored thereon computer-executable instructions which, when executed by a computer, cause the computer to:
receive the input seismic trace; and
create a t by Q gather using the input seismic trace, wherein t represents traveltime, Q represents absorption parameter, and the t by Q gather has traveltime as the vertical axis and a ratio of t and Q as the horizontal axis, wherein the ratio of t and Q is referred to as R.

26. The non-transitory computer-readable medium of claim 25, further comprising computer-executable instructions which, when executed by the computer, cause the computer to: apply an interpolation algorithm to the t by Q gather to derive a corrected input seismic trace.

27. The non-transitory computer-readable medium of claim 25, wherein the computer-executable instructions which, when executed by the computer, cause the computer to create the t by Q gather comprises computer-executable instructions that cause the computer to receive an absorption parameter Q(t).

* * * * *